(12) United States Patent
Bahrami et al.

(10) Patent No.: US 10,579,372 B1
(45) Date of Patent: Mar. 3, 2020

(54) METADATA-BASED API ATTRIBUTE EXTRACTION

(71) Applicant: FUJITSU LIMITED, Kawasaki-shi, Kanagawa (JP)

(72) Inventors: Mehdi Bahrami, Santa Clara, CA (US); Mehdi Assefi, Athens, GA (US); Wei-Peng Chen, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/214,072

(22) Filed: Dec. 8, 2018

(51) Int. Cl.
- G06F 9/44 (2018.01)
- G06F 8/75 (2018.01)
- G06F 8/73 (2018.01)
- G06K 9/00 (2006.01)
- G06F 8/35 (2018.01)
- G06F 8/10 (2018.01)
- G06N 20/00 (2019.01)

(52) U.S. Cl.
CPC .............. *G06F 8/75* (2013.01); *G06F 8/10* (2013.01); *G06F 8/35* (2013.01); *G06F 8/73* (2013.01); *G06K 9/00469* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 2006/0224579 | A1* | 10/2006 | Zheng | G06F 16/951 |
| 2015/0294233 | A1* | 10/2015 | Aultman | G06N 20/00 706/12 |
| 2017/0012838 | A1* | 1/2017 | Kashtan | G06F 8/73 |
| 2018/0052861 | A1* | 2/2018 | Seetharaman | G06Q 10/0637 |
| 2018/0165135 | A1 | 6/2018 | Bahrami et al. | |
| 2018/0260389 | A1 | 9/2018 | Bahrami et al. | |
| 2019/0095318 | A1* | 3/2019 | Bahrami | G06N 5/047 |
| 2019/0122136 | A1* | 4/2019 | Dirac | G06N 20/00 |

(Continued)

OTHER PUBLICATIONS

Schelter et al., Automatically Tracking Metadata and Provenance of Machine Learning Experiments, Machine Learning Systems Workshop at NIPS 2017 (Year: 2017).*

(Continued)

*Primary Examiner* — Insun Kang (74) *Attorney, Agent, or Firm* — Maschoff Brennan (57) ABSTRACT

A method of machine learning may include receiving an API documentation including an endpoint and corresponding metadata. The method may include receiving a verified API specification including a verified endpoint. The method may include comparing the endpoint to the verified endpoint. The method may include classifying the metadata. The metadata may be classified as a positive item responsive to the endpoint being substantially the same as the verified endpoint. The metadata may be classified as a negative item responsive to the endpoint not being substantially the same as the verified endpoint. The method may include generating a training dataset, which may include the metadata classified as a positive item or a negative item. The method may include generating a metadata model using a machine learning algorithm and the training dataset. The metadata model may be configured to be used to determine whether an unknown endpoint is a positive endpoint.

20 Claims, 6 Drawing Sheets

(56) References Cited

U.S. PATENT DOCUMENTS

| | | | | |
|---|---|---|---|---|
| 2019/0243642 A1* | 8/2019 | Bahrami | .................... | G06F 8/73 |
| 2019/0251251 A1* | 8/2019 | Carson | .................... | G06F 21/51 |
| 2019/0266287 A1* | 8/2019 | Chen | ....................... | G06F 9/547 |
| 2019/0317842 A1* | 10/2019 | Bharti | ..................... | G06F 9/541 |
| 2019/0325259 A1* | 10/2019 | Murphy | ............... | G06K 9/6259 |
| 2019/0340518 A1* | 11/2019 | Merrill | .................. | G06F 16/908 |

OTHER PUBLICATIONS

U.S. Appl. No. 15/887,906, filed Feb. 2, 2018, Dec. 8, 2019.
Bahrami, Mehdi, et al., "API learning: Applying machine learning to manage the rise of API economy.". Companion of the Web Conference 2018 on the Web Conference 2018. International World Wide Web Conferences Steering Committee, 2018.

* cited by examiner

FIG. 6

METADATA-BASED API ATTRIBUTE EXTRACTION

FIELD

The embodiments discussed in the present disclosure are related to metadata-based API attribute extraction.

BACKGROUND

Software applications may be built using one or more application programming interfaces (API or APIs), each of which is a set of routines, protocols, and tools. API specifications specify how other software components interact with the API based on its definition. API specifications may specify how APIs perform and how the APIs interact with other APIs. APIs may also be used to show the results in a graphical user interface (GUI) component. An API specification may expose at least some functions and/or data of a software application that enables other applications to use resources of the API without concern for implementation of the functions or data. Additionally, API specifications may be generated based on API documentations. API documentations may specify how specific functions of APIs may operate. Additionally, API documentations may specify limitations of APIs.

The subject matter claimed in the present disclosure is not limited to embodiments that solve any disadvantages or that operate only in environments, such as those described. Rather, this background is only provided to illustrate one example technology area where some embodiments described in the present disclosure may be practiced.

SUMMARY

According to an aspect of an embodiment, a method of machine learning using application programming interface (API) documentation may include receiving a first API documentation. The first API documentation may include an endpoint and metadata that corresponds to the endpoint. The metadata may include at least one of a header, a page title, and a sentence that correspond to the endpoint. The method may also include receiving a verified API specification. The verified API specification may include a verified endpoint. Additionally, the method may include comparing the endpoint to the verified endpoint. The method include classifying the metadata. The metadata may be classified as a positive item responsive to the endpoint being substantially the same as the verified endpoint. The metadata may be classified as a negative item responsive to the endpoint not being substantially the same as the verified endpoint. The method may also include generating a training dataset. The training dataset may include the metadata classified as a positive item or a negative item. Additionally, the method may include generating a metadata model using a machine learning algorithm and the training dataset. The metadata model may be configured to be used to determine whether an unknown endpoint is a positive endpoint based on corresponding metadata.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

The object and advantages of the embodiments will be realized and achieved at least by the elements, features, and combinations particularly pointed out in the claims. Both the foregoing general description and the following detailed description are exemplary and explanatory and are not restrictive.

BRIEF DESCRIPTION OF THE DRAWINGS

Example embodiments will be described and explained with additional specificity and detail through the use of the accompanying drawings in which.

DETAILED DESCRIPTION

Some embodiments described in the present disclosure relate to metadata-based application programming interface (API) attribute extraction. The extracted API attribute may include attributes and/or endpoints directed to an API. In some embodiments, the attributes and the endpoints may be extracted from API documentations. Manually extracting the attributes and the endpoints from the API documentations may be a labor intensive and error prone process. Models generated using machine learning algorithms may be used to extract the attributes and the endpoints from the API documentation in a more efficient manner. Additionally, the models may reduce a likelihood of errors that may occur during manual extraction of the attributes and the endpoints.

Some extraction technologies may extract limited information from API documentations. For example, some extraction technologies may only extract HTTP verb functions corresponding to the attributes and the endpoints. As another example, some extraction technologies may only extract objects corresponding to the attributes or the endpoints.

Some models may be trained to identify the attributes and the endpoints that are compatible with an API based on a relation between the objects included in the attributes and the endpoints. Additionally, some models may be trained to identify the attributes and the endpoints that are compatible with the API based on HTTP verb functions associated with the attributes and the endpoints. For example, some models may be trained to identify attributes and endpoints that are associated with the HTTP verb function, such as: "GET" as being compatible with the API. Training a model to identify attributes and endpoints as being compatible with the API based on only on associated HTTP verb functions may cause errors in future identifications. For example, an attribute or endpoint may be extracted from subsequent API documentations that include the HTTP verb function "get", which may not be identified as a being compatible with the API since the extracted HTTP verb function "get" is lowercase and not upper case like "GET".

Furthermore, some models may be trained to identify the attributes and the endpoints that are compatible with the API using contents of tables associated with the attributes and endpoints. Likewise, some models may be trained using hypertext transfer text protocol (HTTP) verbs, uniform resource locators (URLs), and/or uniform resource identifiers (URIs) corresponding to the attributes or the endpoints that are compatible with the API.

Some machine learning algorithms may train models that identify attributes and endpoints from API documentations as incorrect information. Incorrect identification of the attributes and the endpoints as being compatible may be due to differences in formats of API documentations and/or API specifications. API documentations may generally be used to describe how particular functions of the API are implemented. Additionally, API documentations may be generally used to describe constraints of the API. Meanwhile, API specifications may be used to describe how functions of the API behave. Likewise, API specifications may be used to describe how functions and/or the API are connected to or interact with other APIs. Thus, these models may be trained to erroneously identify attributes and endpoints in API documentation that are not actually compatible with the API.

Therefore, a need exists for an extraction process and a model training process (e.g., a machine learning algorithm) that may train a metadata model to identify attributes or endpoints as being compatible with the API using information beyond the examples discussed above. According to various embodiments, as described more fully below, attributes, endpoints, and metadata corresponding to the attributes and/or the endpoints in a first API documentation may be extracted. In some embodiments, the metadata may include one or more headers, one or more paragraphs, or one or more sentences that are before the extracted attributes and endpoints in the first API documentation. Additionally or alternatively, the metadata may include one or more endpoint descriptions, one or more page titles, or one or more other paragraphs and one or more sentences that are before the extracted attributes and endpoints in the first API documentation. Furthermore, in some embodiments, the metadata may include endpoint properties, endpoint parameters, endpoint responses, and/or endpoint securities associated with the attributes and the endpoints in the first API documentation. In some embodiments, the headers may be considered as signatures of the attributes or the endpoints in the first API documentation.

Additionally, in some embodiments, verified attributes and verified endpoints may be extracted from a verified API specifications. The verified endpoints and the verified attributes may be compatible with the API. In some embodiments, the attributes and the endpoints extracted from the first API documentation may be compared to the verified attributes and the verified endpoints extracted from the verified API specification. In these and other embodiments, the metadata corresponding to the attributes and the endpoints may be classified as positive items or negative items based on whether a corresponding attribute or endpoint is substantially the same as one or more verified attributes or endpoints.

Positive items may include metadata corresponding to the attributes and the endpoints that are substantially the same as one or more verified attributes or verified endpoints (e.g., the corresponding attributes and endpoints may be identified as being compatible with the API). Negative items may include metadata corresponding to the attributes and the endpoints that are not substantially the same as any verified attribute or verified endpoint (e.g., the corresponding attributes and endpoints may be identified as not being compatible with the API).

In some embodiments, portions of the metadata may be classified as positive items or negative items using cross-validation of the corresponding attributes and endpoints with the verified attributes and the verified endpoints. In some embodiments, the portions of the metadata classified as positive items may include valid headers, endpoint descriptions, page titles, or other identifying information for the corresponding attributes and endpoints. Additionally or alternatively, the metadata classified as negative items may include invalid headers, endpoint descriptions, page titles, or other identifying information for the corresponding attributes and endpoints.

In some embodiments, a training dataset may be generated that includes all of the metadata classified as either positive items or negative items. The metadata model may be generated using a machine learning algorithm. The metadata model may be generated using a support vector machine (SVM) algorithm, a long short-term memory (LSTM) algorithm, a convolutional neural network (CNN) algorithm, or any other appropriate machine learning algorithm. The metadata model may be trained to determine whether unknown endpoints (e.g., endpoints that have not been identified previously) are compatible with the API based on corresponding metadata. Additionally, the metadata model may be trained to determine whether unknown attributes (e.g., attributes that have not been identified previously) are compatible with the API based on corresponding metadata.

Additionally, in some embodiments, a second API documentation may be received. The second API documentation may include unknown attributes and unknown endpoints. The unknown attributes and the unknown endpoints may be extracted from the second API documentation. In addition, metadata corresponding to the unknown attributes and the unknown endpoints may be extracted from the second API documentation. The metadata model may be used to identify which attributes and endpoints in the second API documentation are compatible with the API based on the corresponding metadata. For example, the metadata model may be used to determine whether a header of any of the unknown attributes or the unknown endpoints is substantially the same as one or more headers in the metadata model.

Furthermore, in some embodiments, a revised API specification may be generated using the unknown attributes and/or unknown endpoints identified as being compatible with the API using the metadata model. The revised API specification may include each unknown attribute from the second API documentation that is identified as being compatible with the API. Likewise, the revised API specification may include each unknown endpoint from the second API documentation that is identified as being compatible with the API. In addition, in some embodiments, the revised API specification may include the metadata that corresponds to the unknown attributes and the unknown endpoints that are compatible with the API.

A benefit of the metadata model using metadata to determine whether attributes and endpoints are compatible with the API may include properly identifying more attributes and endpoints as being compatible with the API than previously would have been. Additionally, a benefit of the metadata model using metadata to determine whether attributes and endpoints are compatible with the API may include properly identifying more attributes and endpoints as not being compatible with the API than previously would have been. Furthermore, the metadata model may identify attributes and endpoints as being compatible or not with the API without considering specific HTTP verb functions listed in the API documentation. For example, the metadata model may identify attributes and endpoints as being compatible or not with the API without considering HTTP verb functions such as POST, GET, DELETE, or any other appropriate HTTP verb function.

Determining whether attributes and endpoints are compatible with the API without considering HTTP verb functions may permit API documentation that does not include HTTP verb functions (e.g., API documentation in a simple object access protocol (SOAP) format) to be properly identified. Additionally, determining whether attributes and endpoints are compatible with the API using the metadata instead of the HTTP verb functions may reduce attributes and endpoints included in the revised API specification which may reduce processing needs and power for further analysis to properly identify attributes and endpoints. For example, determining whether attributes and endpoints are compatible with the API solely based on whether the attributes and the endpoints do not include HTTP verb functions would return attributes and endpoints that are and that are not compatible with the API. Limiting the results to attributes and endpoints that correspond to metadata that is identified as a positive item using the metadata model may reduce the amount of attributes and endpoints included in the revised API specification that are not actually compatible with the API.

An example of attributes and endpoints that may not be detected properly as being compatible with an API may include determining whether endpoints and attributes in API documentations that correspond to a target API. The API documentation may include the HTTP verb function "GET" for each attribute and endpoint or may not include. Thus, if identification of the attributes and the endpoints was based merely on identifying a HTTP verb function, each attribute and endpoint in the API documentations may not be identified. However, not every attribute or endpoint is actually compatible with the target API. In contrast, using the trained metadata model as discussed in the present disclosure may identify each attribute and endpoint in the API documentation as being compatible with the target API.

Embodiments of the present disclosure are explained with reference to the accompanying drawings.

Figure 1:
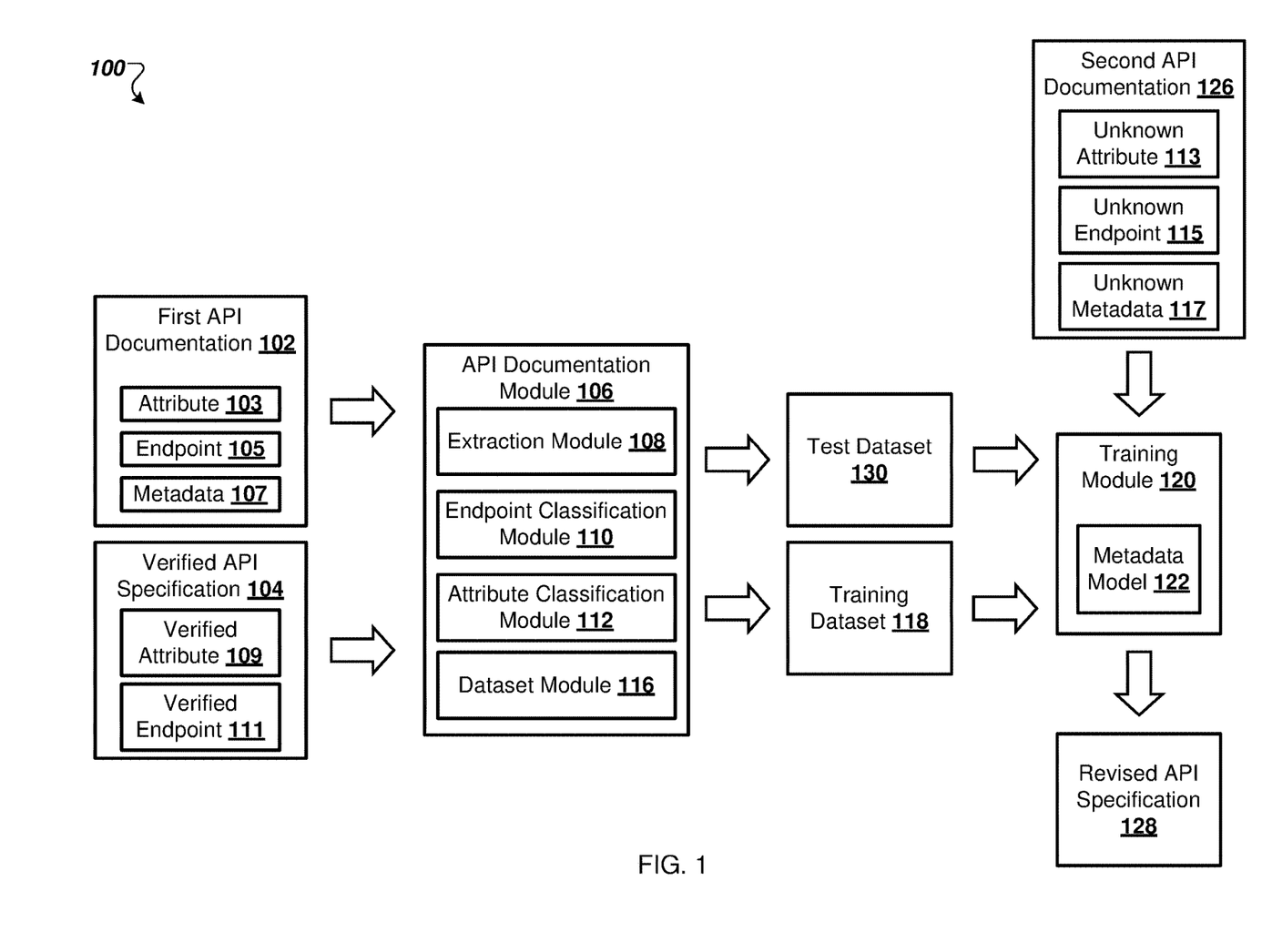
FIG. 1 illustrates a block diagram of an example operating environment related to generating a training dataset, training a metadata model, and generating a revised API specification.

FIG. 1 illustrates a block diagram of an example operating environment 100 related to generating a training dataset 118, training a metadata model 122, and generating a revised API specification 128. The environment 100 may include an API documentation module 106, and a training module 120. The API documentation module 106 may include an extraction module 108, an endpoint classification module 110, an attribute classification module 112, and a dataset module 116.

The API documentation module 106 may include a computer-based hardware device that includes a processor, memory, and/or communication capabilities. Some examples of the API documentation module 106 may include a tablet computer, a laptop computer, a desktop computer, or a connected device, etc. The API documentation module 106 may include a processor-based computing device. For example, the API documentation module 106 may include a hardware server or another processor-based computing device configured to function as a server. The API documentation module 106 may include memory and network communication capabilities.

The training module 120 may also include a computer-based hardware device that includes a processor, memory, and/or communication capabilities. Some examples of the training module 120 may also include a tablet computer, a laptop computer, a desktop computer, or a connected device, etc. The training module 120 may also include a processor-based computing device. For example, the training module 120 may also include a hardware server or another processor-based computing device configured to function as a server. The training module 120 may also include memory and network communication capabilities.

The API documentation module 106 may be configured to receive a first API documentation 102 and a verified API specification 104 (e.g., a ground-truth API specification). The first API documentation 102 may include an attribute 103 and an endpoint 105. The endpoint 105 may include one or more addresses or other identifiers that the API may be configured to communicate with. For example, the endpoint 105 may include a URL or a URI. Additionally, the first API documentation 102 may include metadata 107 that corresponds to the attribute 103 and the endpoint 105. In some embodiments, the metadata 107 may correspond to both the attribute 103 and the endpoint 105. For example, the metadata 107 may include one or more header that corresponds to both the attribute 103 and the endpoint 105. In other embodiments, the metadata 107 may include multiple portions of information. Different portions of the information in the metadata 107 may correspond to the attribute 103 and the endpoint 105. For example, the metadata 107 may include a first header and a second header. The first header may correspond to the endpoint 105 (e.g., the first header may be an endpoint header) and the second header may correspond to the attribute 103 (e.g., the second header may be an attribute header).

The first API documentation 102 may include information describing the API in a documentation format. For example, the first API documentation 102 may describe the included information (e.g., the attribute 103, the endpoint 105, and the metadata 107) in hypertext markup language (HTML), JavaScript notation (JSON), or any other appropriate format. A file format of the first API documentation 102 may include a portable document format (PDF), a .doc format (e.g., a Microsoft word document format), or any other appropriate file format.

In some embodiments, the metadata 107 may include one or more headers, one or more paragraphs, or one or more sentences that are located before the attribute 103 and the endpoint 105 in the first API documentation 102. Additionally or alternatively, the metadata 107 may include one or more endpoint descriptions, one or more page titles, one or more paragraphs, or one or more sentences that are before the attribute 103 and the endpoint 105 in the first API documentation 102. Furthermore, in some embodiments, the metadata 107 may include endpoint properties, endpoint parameters, endpoint responses, and/or endpoint securities associated with the attribute 103 and the endpoint 105. In some embodiments, headers may be considered as signatures of the attribute 103 and the endpoint 105. Additionally or alternatively, the metadata 107 may include a title of a page on an HTML file.

The verified API specification 104 may include a verified attribute 109 and a verified endpoint 111. The verified attribute 109 and the verified endpoint 111 may be directed to the API. In some embodiments, the verified API specification 104 may be an API specification that has been crowd proofed by users of the API (e.g., if a user or a software application/hardware/device successfully interacted with the API and the API returns success code, e.g., a 200 Response Code). In other embodiments, the verified API specification 104 may be provided by a manager of the API. The verified API specification 104 may include the verified attribute 109 and the verified endpoint 111 describing the API in a specification format.

The extraction module 108 may extract the attribute 103, the endpoint 105, and the metadata 107 from the first API documentation 102. Additionally, the extraction module 108 may extract the verified attribute 109 and the verified endpoint 111 from the verified API specification 104. In some embodiments, extraction of the attribute 103, the endpoint 105, the metadata 107, the verified attribute 109, and the verified endpoint 111 may be performed using API harmony. In some embodiments, the attribute 103 and the endpoint 105 may be extracted from the first API documentation 102 based on HTTP verb functions and/or objects associated with the attribute 103 and the endpoint 105. In these and other embodiments, the verified attribute 109 and the verified endpoint 111 may be extracted from the verified API specification 104 based on HTTP verb functions and/or objects associated with the verified attribute 109 and the verified endpoint 111.

The endpoint classification module 110 may compare the endpoint 105 to the verified endpoint 111. In some embodiments, the endpoint 105 may be classified as being compatible with the API if the endpoint 105 is substantially the same as the verified endpoint 111. In these and other embodiments, the portion of the metadata 107 corresponding to the endpoint 105 may be classified as a positive item. In some embodiments, the endpoint 105 may be classified as not being compatible with the API if the endpoint 105 is not substantially the same as the verified endpoint 111. In these and other embodiments, the portion of the metadata 107 corresponding to the endpoint 105 may be classified as a negative item.

In some embodiments, it may be determined whether the endpoint 105 is substantially the same as the verified endpoint 111 using sequence matching. Sequence matching may compare content (e.g., words) of the endpoint 105 to content of the verified endpoint 111 to determine an accuracy of overlap of the content. A sequence match value for the endpoint 105 compared to the verified endpoint 111 may be determined. The sequence match value may be compared to a comparison threshold value. If the sequence match value is equal to or greater than the comparison threshold value, the endpoint 105 may be classified as being substantially the same as the verified endpoint 111. Alternatively, if the sequence match value is less than the comparison threshold value, the endpoint 105 may be classified as not being substantially the same as the verified endpoint 111. The sequence threshold value may be between fifty percent and eighty percent.

In some embodiments, if the endpoint 105 is classified as being compatible with the API, this may indicate that the endpoint 105 would have been properly identified as being compatible with the API by a model trained using the HTTP verb function, object relation, or other method for identifying the endpoint 105. In these and other embodiments, if the endpoint 105 is classified as not being compatible with the API, this may indicate that the endpoint 105 would have been improperly identified as being compatible with the API by a model trained using the HTTP verb function, object relation, or other method for identifying the endpoint 105. In some embodiments, the endpoint classification module 110 may output the classification of the endpoint 105 according to the following:

Endpoint, Header of Endpoints that Describe the Endpoints, Page Title, Positive/Negative The attribute classification module 112 may compare the attribute 103 to the verified attribute 109. In some embodiments, the attribute 103 may be classified as being compatible with the API if the attribute 103 is substantially the same as the verified attribute 109. In these and other embodiments, the portion of the metadata 107 corresponding to the attribute 103 may classified as a positive item. In some embodiments, the attribute 103 may be classified as not being compatible with the API if the attribute 103 is not substantially the same as the verified attribute 109. In these and other embodiments, the portion of the metadata 107 corresponding to the attribute 103 may be classified as a negative item.

In some embodiments, it may be determined whether the attribute 103 is substantially the same as the verified attribute 109 using sequence matching. Sequence matching may compare content (e.g., words) of the attribute 103 to content of the verified attribute 109 to determine an accuracy of overlap of the content. A sequence match value for the attribute 103 compared to the verified attribute 109 may be determined. The sequence match value may be compared to the comparison threshold value. If the sequence match value is equal to or greater than the comparison threshold value, the attribute 103 may be classified as being substantially the same as the verified attribute 109. Alternatively, if the sequence match value is less than the comparison threshold value, the attribute 103 may be classified as not being substantially the same as the verified attribute 109.

In some embodiments, if the attribute 103 is classified as being compatible with the API, the result may indicate that the attribute 103 would have been properly identified as being compatible with the API by a model trained using the HTTP verb function, object relation, or other method for identifying the attribute 103. In these and other embodiments, if the attribute 103 is classified as not being compatible with the API, the result may indicate that the attribute 103 would have been improperly identified as being compatible with the API by a model trained using the HTTP verb function, object relation, or other method for identifying the attribute 103. In some embodiments, the attribute classification module 112 may output the classification of the attribute 103 according to the following:

Attribute, Header of Table that Explain the Table Content, Type/Page Title, Positive/Negative The dataset module 116 may generate the training dataset 118. In some embodiments, the training dataset 118 may include the metadata 107 classified as a positive item or a negative item. In other embodiments, the training dataset 118 may include the metadata 107 with a first portion labelled as a positive item and a second portion labelled as a negative item. For example, the training dataset 118 may include a table that includes one or more rows and one or more columns. A single portion of the metadata 107 may be listed in each row. A column of the table may be used to list the classification of the corresponding portion of the metadata 107. Additionally or alternatively, the training dataset 118 may include the metadata 107 with multiple portions labelled as positive items and negative items.

In some embodiments, a first row of the table may be labelled Parameters: 1, a second row of the table may be labelled Response: 2, a third row of the table may be labelled Security: 3, and a fourth row of the table may be labelled SecurityDefinitions: 4. In other embodiments, the first row of the table may be labelled Responses, the second row of the table may be labelled Parameters, the third row of the table may be labelled Descriptions, the fourth row of the table may be labelled Security, and a fifth row of the table may be labelled SecurityDefinitions.

The dataset module 116 may also generate a test dataset 130. The test dataset 130 may include one or more test attributes, one or more test endpoints, and a test header for each of the test attributes and the test endpoints. In some embodiments, the test dataset 130 may be generated using multiple API documentations (not illustrated). In other embodiments, the test dataset 130 may include multiple attributes and endpoints loaded on the dataset module 116 during installation. Additionally or alternatively, the test dataset 130 may be provided by the manager of the API. In some embodiments, the test dataset 130 may include a portion of a content of the first API documentation 102. For example, the test dataset 130 may include substantially twenty five percent of the content of the first API documentation 102. As another example, the test dataset 130 may include substantially thirty percent of the content of the first API documentation 102. In these and other embodiments, the training dataset 118 may include a remainder of the content of the first API documentation 102 (e.g., substantially seventy five percent or substantially seventy percent).

The training module 120 may receive the training dataset 118 and the test dataset 130. The training module 120 using the test dataset 130 may generate the metadata model 122 using a machine learning algorithm. In some embodiments, the training module 120 may remove at least one tag from the training dataset 118 (e.g., clean the training dataset 118). In some embodiments, the tags may include HTML tags such as <h1></h1> and <b></b> or any other appropriate tag. If the source is a PDF file, DOC and etc., then it will consider format of the contents (e.g., select larger fonts as headers).

In some embodiments, the training module 120 may separate each natural language content and symbol in the training dataset 118 and the testing dataset. Additionally, each separated natural language content and separated symbol may be labelled as a different token. For example, if the content of the endpoint 105 includes "This API endpoint returns the lists of users.", each natural language content and the period may be separated and labelled as different tokens (e.g., "This", "API", "endpoint", "returns", "the", "lists", "of", "users", and "."). In these and other embodiments, the training module 120 may extract a stem of at least one token in the training dataset 118. The stem may include a minimum number of letters and symbols to recognize different versions of the same natural language content or symbol in different tokens. For example, stems for "API provides" and "API providing" may be the same (e.g., "API" and "provid"). Extracting a stem of each token may permit equivalent processing of different forms of natural language content included in the tokens.

In some embodiments, the training module 120 may determine a frequency of at least one token in the training dataset. Determining a frequency of the tokens (e.g., the natural language content) in the training dataset 118 may indicate which tokens are more common. In some embodiments, the frequency of the tokens may be determined using a term frequency (tf) algorithm, a term frequency—inverse document frequency (tfidf) algorithm, or any other appropriate algorithm. In some embodiments, the training module 120 may generated the metadata model 122 using machine learning based on the frequency of at least one token in the training dataset 118. In these and other embodiments, the training module 120 may use a SVM algorithm, a LSTM algorithm, a CNN algorithm, or any other appropriate algorithm for performing the machine learning.

Additionally, the training module 120 may test the metadata model 122 using the test dataset 130. For example, the training module 120 may compare the test metadata corresponding to the test attributes and the test endpoints in the test dataset 130 to the metadata included in the metadata model 122. The training module 120 may identify each test attribute and each test endpoint as being compatible or not with the API using the metadata model 122. If the training module 120 properly identifies at least substantially 90% each test attribute and each test endpoint, the metadata model 122 may be ready for implementation. Otherwise, if the metadata model 122 is not ready for implementation, the API documentation module 106 and the training module 120 may repeat the processes described above with additional API documentation (not illustrated) until the metadata model 122 is ready for implementation. The metadata model may be configured to determine whether unknown attributes and unknown endpoints are compatible with the API based on corresponding unknown metadata.

The training module 120 may receive a second API documentation 126. The second API documentation 126 may include an unknown attribute 113 and an unknown endpoint 115. Additionally, the second API documentation 126 may include unknown metadata 117 that corresponds to the unknown attribute 113 and the unknown endpoint 115. The second API documentation 126 may be an API documentation that has not been previously analyzed by the training module 120.

The training module 120 may extract the unknown attribute 113, the unknown endpoint 115, and the unknown metadata 117 as discussed above in relation to the attribute 103, the endpoint 105, and the metadata 107. The training module 120 may determine whether the unknown attribute 113 and the unknown endpoint 115 are compatible with the API using the metadata model 122 and the unknown metadata 117. For example, the training module 120 may determine whether portions of the unknown metadata 117 that correspond to the unknown attribute 113 and the unknown endpoint 115 are substantially the same as the metadata included in the metadata model 122.

In some embodiments, if a portion of the unknown metadata 117 corresponding to the unknown endpoint 115 is substantially the same as the metadata in the metadata model 122, the unknown endpoint 115 may be added to the revised API specification 128. In some embodiments, the unknown endpoint 115 may be labelled as a positive endpoint. Otherwise, the unknown endpoint 115 may not be added to the revised API specification 128. In some embodiments, if a portion of the unknown metadata 117 corresponding to the unknown attribute 113 is substantially the same as the metadata in the metadata model 122, the unknown attribute 113 may be added to the revised API specification 128. In some embodiments, the unknown attribute 113 may be labelled as a positive attribute. Otherwise, the unknown attribute 113 may not be added to the revised API specification 128. The training module 120 may generate and output the revised API specification 128. Additionally or alternatively, the unknown attribute 113 and/or the unknown endpoint 115 may be labelled as a negative attribute or a negative endpoint and stored in a negative dataset for further processing and review.

In some embodiments, extraction of the attribute 103, the endpoint 105, the metadata 107, the unknown attribute 113, the unknown endpoint 115, and unknown metadata 117 may be performed based on font-type and/or font size of the first API documentation 102 and/or the second API documentation 126. Additionally or alternatively, the training dataset 118 may include HTML headers, HTTP verb functions, and object types included in the metadata 107. Furthermore, in some embodiments, the training dataset 118 may generated including different portions of the metadata 107 based on the machine learning algorithm.

Figure 2:
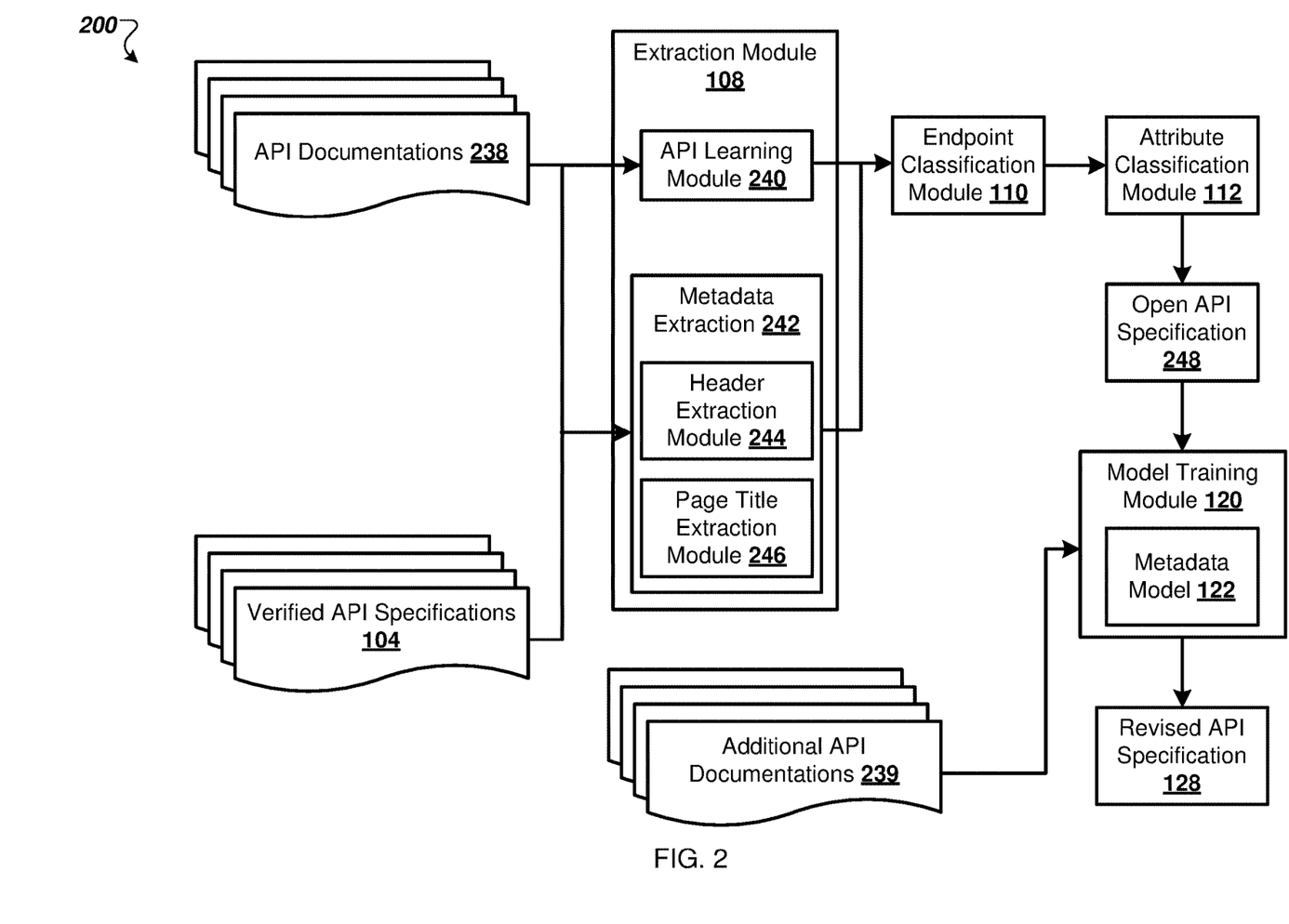
FIG. 2 illustrates a block diagram of an example revised API specification generation process that may be implemented in the operating environment of FIG. 1.

In some embodiments, the attribute 103 and endpoint 105 may be processed and compared to the verified attribute 109 and the verified endpoint 111 according to the following algorithm:

Function FindEndpoint( )
    dataFrame←read endpoints and its headers
    for each endpoint in dataFrame repeat:
    headersList←'headers' of endpoint
    for each record in groundTruth repeat:
        if record is equal to endpoint:
            add endpoint and its headers to positive dataset else:
            add endpoint and its headers to negative dataset In some embodiments, the endpoint 105 may be compared to the verified endpoint 111 according to the following algorithm:

Function FindTable( ):
dataFrame←read Table and its headers
for each API Attribute in dataFrame repeat:
    headersList←'headers' of endpoint
    for each record in groundTruth repeat:
    if record is equal to Table or record is partially equal to Table:
        add Table and headersList to positive dataset else:
        add Table and headersList to negative dataset FIG. 2 illustrates a block diagram of an example revised API specification generation process 200 that may be implemented in the operating environment of FIG. 1. The revised API specification generation process 200 may be implemented by the extraction module 108, the endpoint classification module 110, the attribute classification module 112, and the training module 120 of FIG. 1. The extraction module 108 may include an API learning module 240 and a metadata extraction module 242. The metadata extraction module may include a header extraction module 244 and a page title extraction module 246.

The extraction module 108 may be configured to receive one or more API documentations 238. Each of the API documentations 238 may include multiple attributes and multiple endpoints. Additionally, each of the API documentations 238 may include metadata directed to the attributes and the endpoints in the corresponding API documentations 238. The attributes, the endpoints, and the metadata in the API documentations 238 may be the same as or similar to the attribute 103, the endpoint 105, and the metadata 107 discussed above in relation to FIG. 1. Additionally, the extraction module 108 may be configured to receive one or more the verified API specifications 104.

The API learning module 240 may be configured to extract the attributes and the endpoints in the API documentations 238. In some embodiments, the API learning module 240 may be configured to extract the attributes and the endpoints based on HTTP verb functions, objects, or any other appropriate items associated with the attributes and the endpoints. For example, the API learning module 240 may extract the attributes and the endpoints that are associated with HTTP verb functions and HTTP object types. The API learning module 240 may also be configured to extract the verified attributes and the verified endpoints in the verified API specifications 104. The verified attributes and the verified endpoints may also be extracted based on HTTP verb functions, objects, or any other appropriate items associated with the verified attributes and the verified endpoints.

The header extraction module 244 may be configured to extract one or more headers associated with the extracted attributes and endpoints. The header extraction module 244 may extract one or more sentences and/or one or more paragraphs that are located or positioned before the attributes and the endpoints in the API documentations 238. Additionally, the page title extraction module 246 may be configured to extract one or more page titles associated with the extracted attributes and endpoints. In some embodiments, the page titles may include the URL addresses associated with the attributes and the endpoints.

The endpoint classification module 110 may compare each of the extracted endpoints to the extracted verified endpoints. In some embodiments, one or more extracted endpoints may be classified as being compatible with the API if the one or more extracted endpoints are substantially the same as one or more of the extracted verified endpoints. In these and other embodiments, the portion of the extracted metadata corresponding to the extracted endpoints that are classified as being compatible with the API may be classified as positive items. In some embodiments, one or more extracted endpoints may be classified as not being compatible with the API if the one or more extracted endpoints are not substantially the same as any of the extracted verified endpoints. In these and other embodiments, the portion of the metadata corresponding to the extracted endpoints that are not substantially the same as any of the extracted verified endpoints may be classified as negative items. The extracted endpoints may be compared to the extracted verified attributes using the same or similar processes discussed above in relation to FIG. 1.

The attribute classification module 112 may compare the extracted attributes to the extracted verified attributes. In some embodiments, one or more of the extracted attributes may be classified as being compatible with the API if the one or more extracted attributes are substantially the same as one or more of the verified attributes. In these and other embodiments, the portion of the extracted metadata corresponding to the extracted attributes that are classified as being compatible with the API may be classified as positive items. In some embodiments, the extracted attributes may be classified as not being compatible with the API if the extracted attributes are not substantially the same as any of the extracted verified attributes. In these and other embodiments, the portion of the extracted metadata corresponding to the one or more extracted attributes that are not substantially the same as any of the extracted verified attributes may be classified as negative items.

The extracted attributes, endpoints, headers, and page titles may be included in an open API specification 248. Additionally, the open API specification 248 may include the classification of the metadata, for example, the metadata classified as positive items or negative items. The open API specification 248 may be provided to the training module 120. The training module 120 may generate the metadata model 122 using a machine learning algorithm and the open API specification 248. In some embodiments, the training module 120 may process the open API specification 248 and generate the metadata model 122 as discussed above in relation to FIG. 1.

The training module 120 may receive unknown API documentations 239. The unknown API documentations 239 may include multiple unknown attributes and multiple unknown endpoints. Additionally, the unknown API documentations 239 may include unknown metadata that corresponds to the unknown attributes and the unknown endpoints. The unknown API documentations 239 may be an API documentation that has not been previously analyzed by the training module 120.

The training module 120 may extract the unknown attributes, the unknown endpoints, and the unknown metadata as discussed above in relation to FIG. 1. The training module 120 may determine whether the unknown attributes and the unknown endpoints are compatible with the API using the metadata model 122 and the unknown metadata as also discussed above in relation to FIG. 1. For example, the training module 120 may determine whether portions of the unknown metadata that correspond to the unknown attributes and the unknown endpoints are substantially the same as the metadata included in the metadata model 122.

In some embodiments, if one or more portions of the unknown metadata corresponding to one or more unknown endpoints are substantially the same as the metadata in the metadata model 122, the one or more unknown endpoints may be added to the revised API specification 128. In these and other embodiments, if one or more portions of the unknown metadata corresponding to one or more of the unknown attributes are substantially the same as the metadata in the metadata model 122, the one or more unknown attributes may be added to the revised API specification 128. Additionally or alternatively, any unknown attributes and/or unknown endpoints that correspond to portions of the metadata that are not substantially the same as the metadata in the metadata model 122 may be stored in a negative dataset for further processing and review. The training module 120 may generate and output the revised API specification 128.

Figure 3:
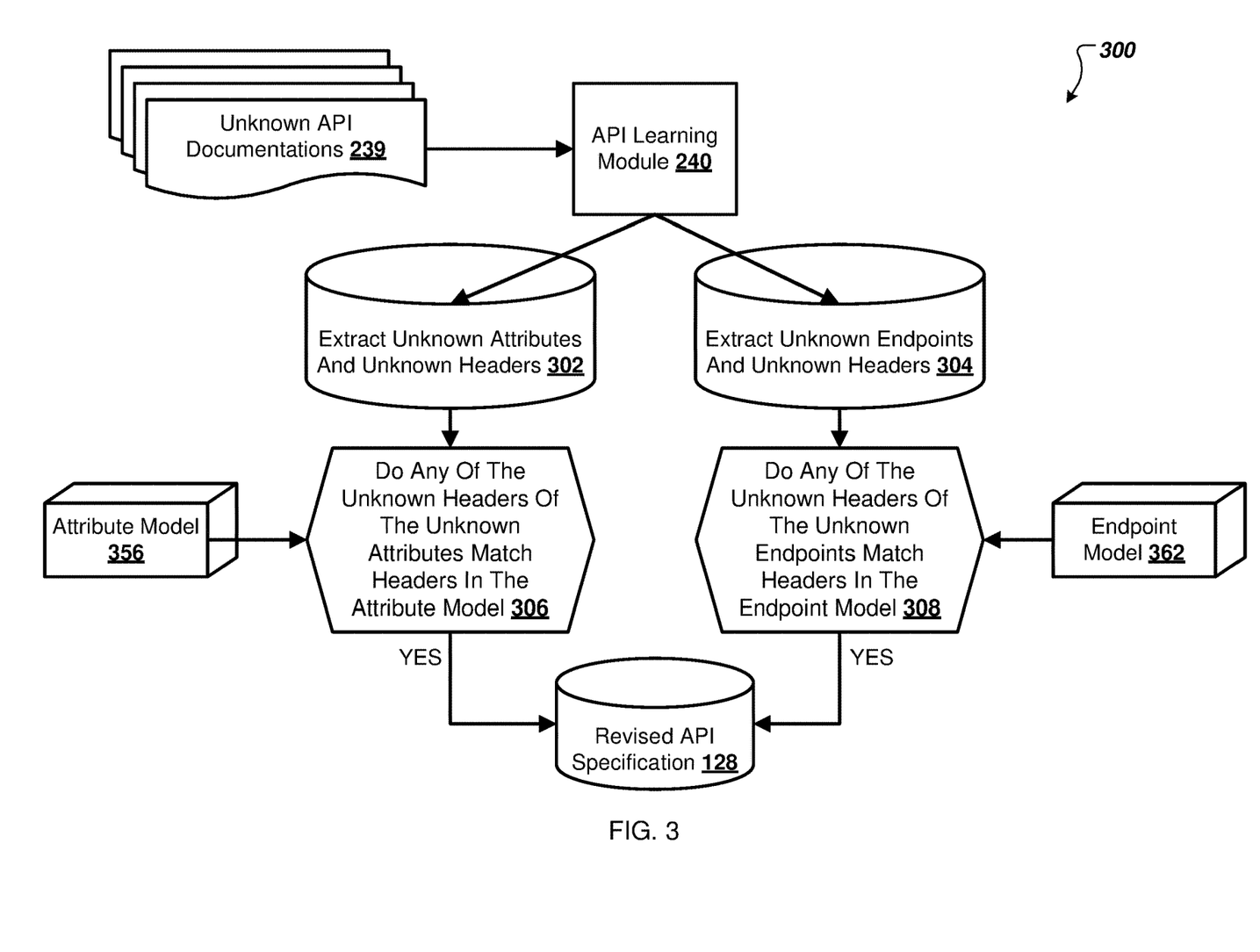
FIG. 3 illustrates a flow diagram of another example revised API specification generation process that may be implemented in the operating environment of FIG. 1 and the process of FIG. 2.

FIG. 3 illustrates a flow diagram of another example revised API specification generation process 300 that may be implemented in the operating environment of FIG. 1 and the process of FIG. 2. At least a portion of the process 300 may be implemented by the API learning module 240 of FIG. 2. The API learning module 240 may receive the unknown API documentations 239. At block 302, the unknown attributes and the unknown headers in the unknown API documentations 239 may be extracted by the API learning module 240. The unknown headers that are extracted may be unknown headers of the unknown attributes. At block 304, the unknown endpoints and the unknown headers may be extracted by the API learning module 240. The unknown headers that are extracted may be unknown headers of the unknown endpoints. The unknown attributes, the unknown endpoints, and the unknown headers in the unknown API documentations 239 may be extracted as discussed above in relation to FIGS. 1 and 2.

At block 306, it may be determined whether any of the unknown headers of the unknown attributes match headers in an attribute model 356. The attribute model 356 may be generated as part of the metadata model 122 discussed above in relation to FIGS. 1 and 2. In some embodiments, the attribute model 356 may include headers that are classified as positive items and are associated with attributes. If any of the unknown headers of the unknown attributes match the headers in the attribute model 356, the unknown headers that match the headers in the attribute model 356 may be included in a revised API specification 128. If one or more unknown headers of the unknown attributes do not match the headers in the attribute model 356, the unknown headers that do not match the headers in the attribute model 356 may not be included in the revised API specification 128.

At block 308, it may be determined whether any of the unknown headers of the unknown endpoints match headers in an endpoint model 362. The endpoint model 362 may be generated as part of the metadata model 122 discussed above in relation to FIGS. 1 and 2. In some embodiments, the endpoint model 362 may include headers that are classified as positive items and are associated with endpoints. If any of the unknown headers of the unknown endpoints match the headers in the endpoint model 362, the unknown headers that match the headers in the endpoint model 362 may be included in the revised API specification 128. If one or more unknown headers of the unknown endpoints do not match the headers in the endpoint model 362, the unknown headers that do not match the headers in the endpoint model 362 may not be included in the revised API specification 128.

Figure 4:
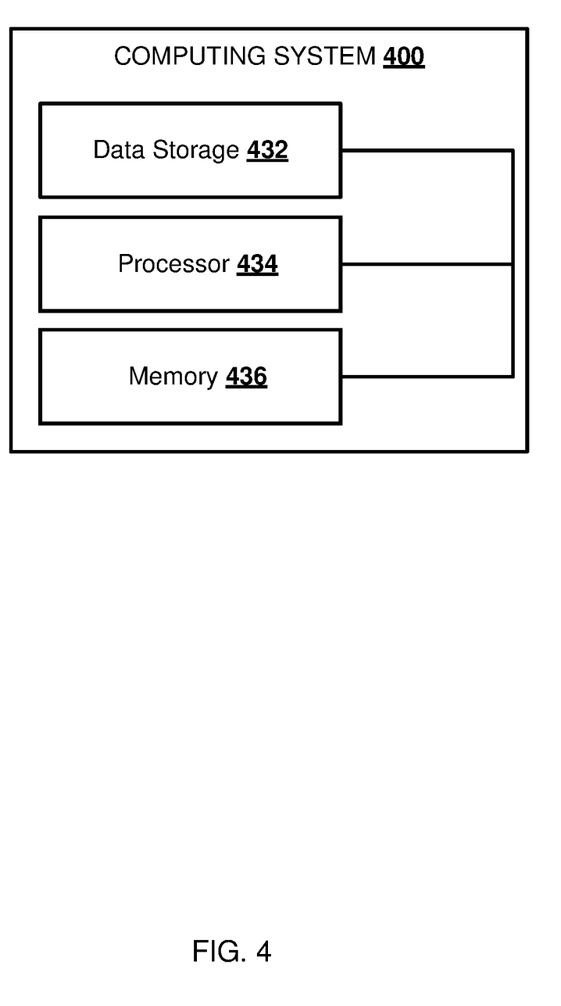
FIG. 4 illustrates a block diagram of an example computing system that is configured for generation of a revised API specification using metadata attribute extraction from an API documentation.

FIG. 4 illustrates a block diagram of an example computing system 400 that is configured for generation of a revised API specification using metadata attribute extraction from an API documentation. The computing system 400 may be implemented in the operating environment 100 of FIG. 1. Examples of the computing system 400 may include the API documentation module 106 and the training module 120 of FIG. 1. The computing system 400 may include one or more processors 434, a memory 436, and a data storage 432.

The processor 434 may include any suitable special-purpose or general-purpose computer, computing entity, or processing device including various computer hardware or software modules and may be configured to execute instructions stored on any applicable computer-readable storage media. For example, the processor 434 may include a microprocessor, a microcontroller, a digital signal processor (DSP), an ASIC, an FPGA, or any other digital or analog circuitry configured to interpret and/or to execute program instructions and/or to process data.

Although illustrated as a single processor in FIG. 4, the processor 434 may more generally include any number of processors configured to perform individually or collectively any number of operations described in the present disclosure. Additionally, one or more of the processors 434 may be present on one or more different electronic devices or computing systems. In some embodiments, the processor 434 may interpret and/or execute program instructions and/or process data stored in the memory 436, the data storage 432, or the memory 436 and the data storage 432. In some embodiments, the processor 434 may fetch program instructions from the data storage 432 and load the program instructions in the memory 436. After the program instructions are loaded into the memory 436, the processor 434 may execute the program instructions.

The memory 436 and the data storage 432 may include computer-readable storage media for carrying or having computer-executable instructions or data structures stored thereon. Such computer-readable storage media may include any available media that may be accessed by a general-purpose or special-purpose computer, such as the processor 434. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 434 to perform a certain operation or group of operations.

Modifications, additions, or omissions may be made to the computing system 400 without departing from the scope of the present disclosure. In some embodiments, the different components of the computing system 400 may be physically separate and may be communicatively coupled via any suitable mechanism. For example, the data storage 432 may be part of a storage device that is separate from a server, which includes the processor 434, and the memory 436, that is communicatively coupled to the storage device. The embodiments described in the present disclosure may include the use of a special-purpose or general-purpose computer including various computer hardware or software modules, as discussed in greater detail below.

Figure 5:
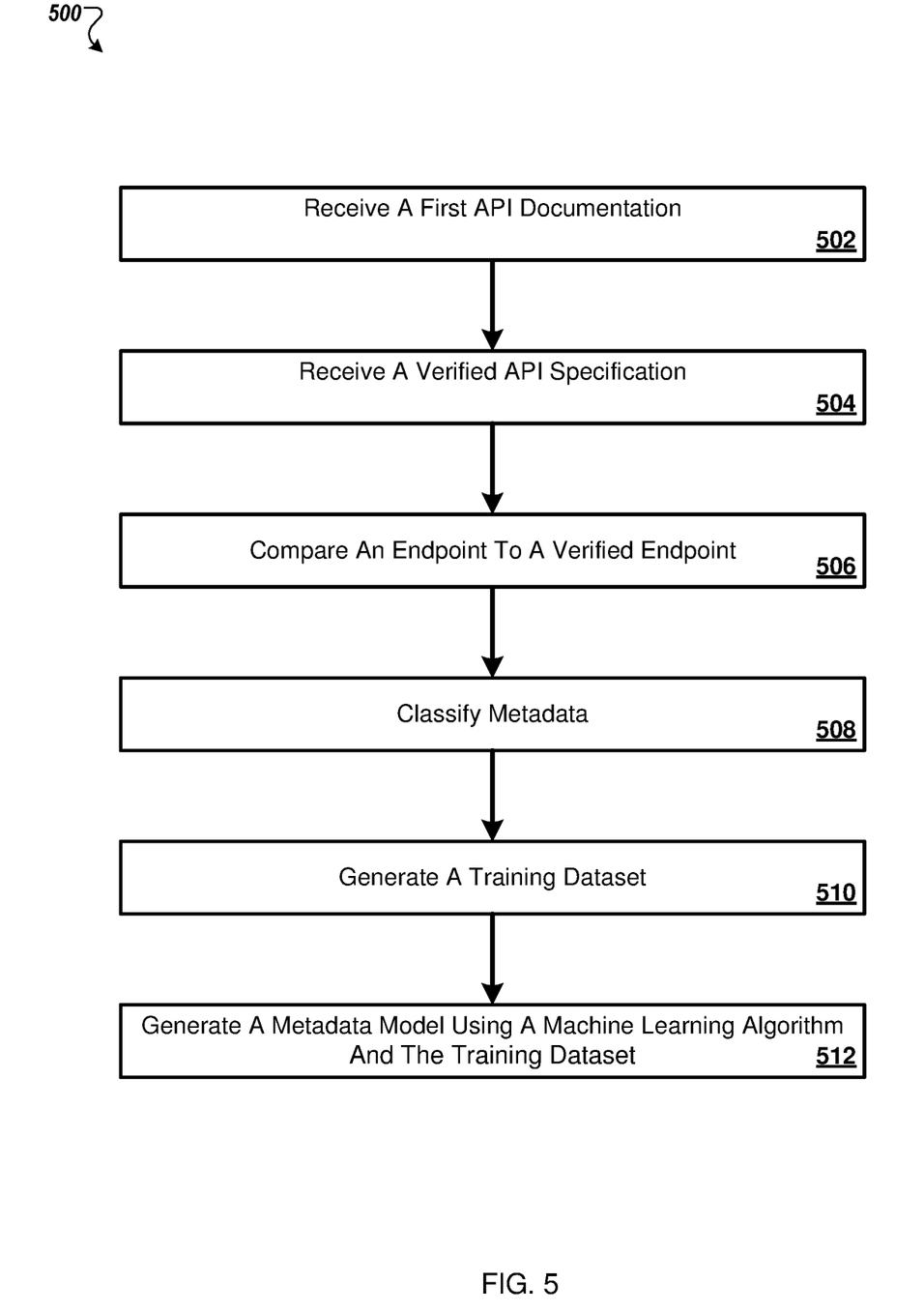
FIG. 5 illustrates a flowchart of an example method of metadata model generation that may be implemented in the operating environment of FIG. 1.

FIG. 5 illustrates a flowchart of an example method 500 of metadata model generation that may be implemented in the operating environment of FIG. 1. The method 500 may be performed by any suitable system, apparatus, or device. For example, the API documentation module 106 and the training module 120 of FIG. 1 or one or more of the components of the computing system 400 of FIG. 4 may perform or cause to be performed one or more processes of the method 500. In these and other embodiments, program instructions stored on a computer readable medium may be executed to perform one or more of the operations of the method 500. Further, each operation of the method 500 may be static or dynamic, and may be performed online (e.g., in real-time), or offline. Further, each operation of the method 500 may be performed incrementally or non-incrementally.

The method 500 may include a block 502, at which a first API documentation may be received. In some embodiments, the first API documentation may include an endpoint and metadata that corresponds to the endpoint. In these and other embodiments, the metadata may include at least one of a header, a page title, and sentences that correspond to the endpoint. For example, the API documentation module 106 of FIG. 1 may receive the first API documentation 102 as discussed above in relation to FIG. 1.

At block 504, a verified API specification may be received. In some embodiments, the verified API specification may include a verified endpoint. For example, the API documentation module 106 of FIG. 1 may receive the verified API specification 104 as discussed above in relation to FIG. 1. At block 506, the end point may be compared to the verified endpoint. For example, the endpoint classification module 110 of the API documentation module 106 of FIG. 1 may compare the endpoint 105 to the verified endpoint 111 as discussed above in relation to FIG. 1.

At block 508, metadata may be classified. In some embodiments, responsive to the endpoint being substantially the same as the verified endpoint, the metadata may be classified as a positive item. In these and other embodiments, responsive to the endpoint not being substantially the same as the verified endpoint, the metadata may be classified as a negative item. For example, the endpoint classification module 110 of the API documentation module 106 of FIG. 1 may classify the metadata 107 as discussed above in relation to FIG. 1.

At block 510, a training dataset may be generated. In some embodiments, the training dataset may include the metadata classified as a positive item or a negative item. For example, the dataset module 116 may generate the training dataset 118 as discussed above in relation to FIG. 1. At block 512, a metadata model may be generated using a machine learning algorithm and the training dataset. In some embodiments, the metadata model may be configured to be used to determine whether an unknown endpoint is a positive endpoint based on corresponding metadata. For example, the training module 120 of FIG. 1 may generate the metadata model 122 as discussed above in relation to FIG. 1.

Modifications, additions, or omissions may be made to the method 500 without departing from the scope of the present disclosure. For example, the operations of method 500 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

Figure 6:
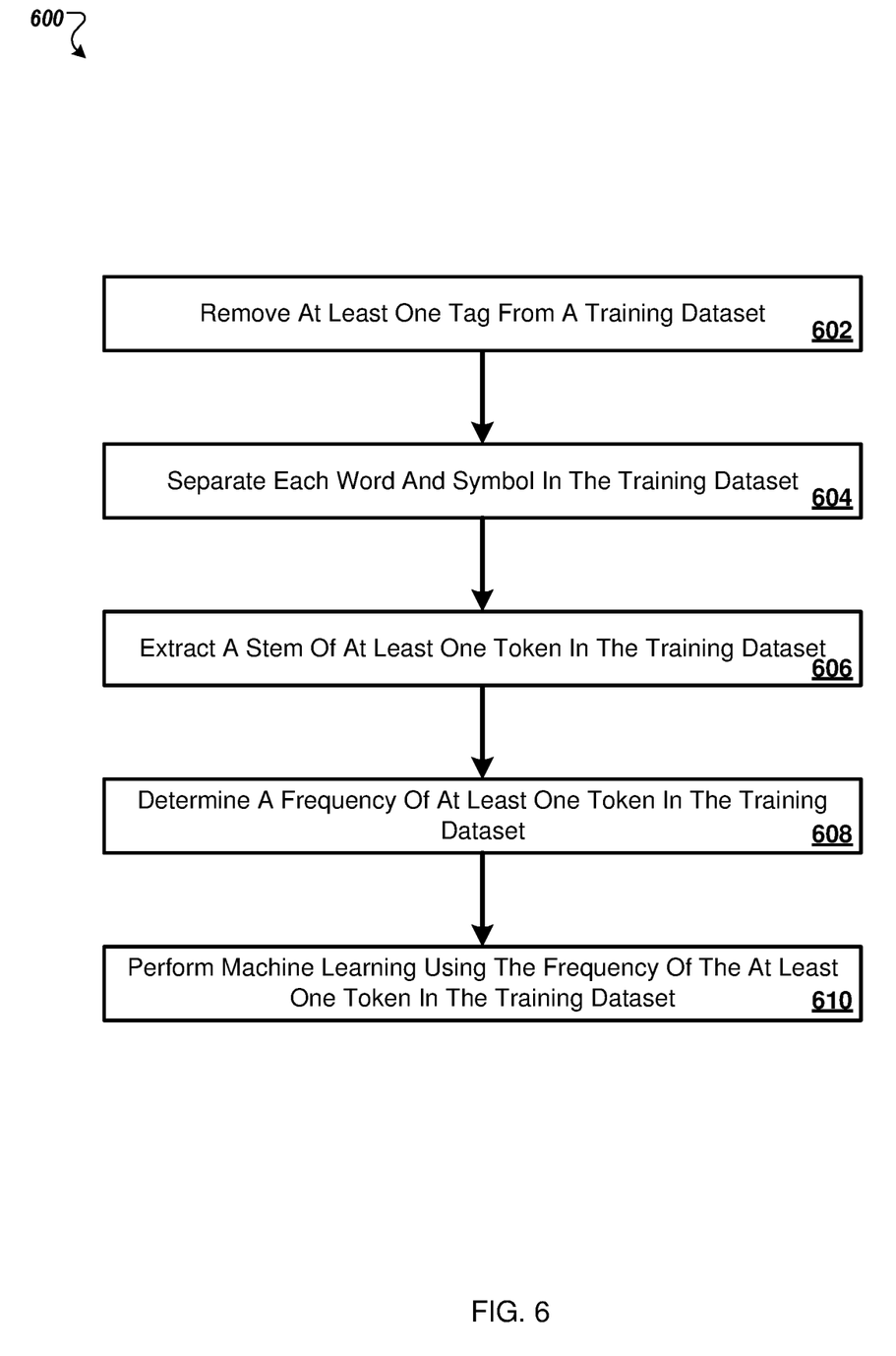
FIG. 6 illustrates a flowchart of an example method of machine learning that may be implemented in the operating environment of FIG. 1, all according to at least one embodiment described in the present disclosure.

FIG. 6 illustrates a flowchart of an example method 600 of machine learning that may be implemented in the operating environment of FIG. 1. The method 600 may be performed by any suitable system, apparatus, or device. For example, the API documentation module 106 and the training module 120 of FIG. 1 or one or more of the components of the computing system 400 of FIG. 4. In these and other embodiments, program instructions stored on a computer readable medium may be executed to perform one or more of the operations of the method 600. Further, each operation of the method 600 may be static or dynamic, and may be performed online (e.g., in real-time), or offline. Further, each operation of the method 600 may be performed incrementally or non-incrementally.

The method 600 may include a block 602, at which at least one tag may be removed from a training dataset. In some embodiments, the tags may be removed from words (e.g., natural language content) included in the training dataset. In these and other embodiments, the tags may include a HTML tag. For example, the training module 120 may remove tags from words in the training dataset 118 as discussed above in relation to FIG. 1.

At block 604, each word and symbol in the training dataset may be separated. In some embodiments, each separated word (e.g., natural language content) and symbol may be labelled as a different token. For example, the training module 120 may separate each word and symbol and tokenize the separated words and symbols as discussed above in relation to FIG. 1.

At block 606, a stem of at least one token in the training dataset may be extracted. In some embodiments, the stem may include a minimum number of letters and symbols to recognize different versions of the same word or symbol in different tokens. For example, the training module 120 may extract a stem of at least one token as discussed above in relation to FIG. 1.

At block 608, a frequency of at least one token in the in the training dataset may be determined. In some embodiments, the frequency of the tokens (e.g., the words) in the training dataset 118 may indicate which tokens are more common. For example, the training module 120 may determine a frequency of at least one token in the training dataset 118 as discussed above in relation to FIG. 1

At block 610, machine learning using the frequency of the at least one token in the training dataset may be performed. In some embodiments, the metadata model may be generated based on the machine learning. In these and other embodiments, the metadata model may be configured to be used to determine whether an unknown endpoint is a positive endpoint based on corresponding metadata. For example, the training module 120 of FIG. 1 may generated the metadata model 122 using machine learning and the frequency of the at least one token as discussed above in relation to FIG. 1.

Modifications, additions, or omissions may be made to the method 600 without departing from the scope of the present disclosure. For example, the operations of method 600 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

Embodiments described in the present disclosure may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data, which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in the present disclosure, terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method of machine learning using application programming interface (API) documentation, the method comprising:
receiving a first API documentation that includes a first endpoint and metadata that corresponds to the first endpoint, wherein the metadata includes at least one of a header, a page title, and a sentence that correspond to the first endpoint;
receiving a verified API specification that includes a verified endpoint;
comparing the first endpoint to the verified endpoint;
classifying the metadata by:
responsive to the first endpoint being the same as the verified endpoint,
classifying the metadata as a positive item; or
responsive to the first endpoint not being the same as the verified endpoint,
classifying the metadata as a negative item;
generating a training dataset including the metadata classified as a positive item or a negative item; and
generating a metadata model using a machine learning algorithm and the training dataset, the metadata model configured to be used to determine whether an unknown endpoint is a positive endpoint based on corresponding metadata.

2. The method of claim 1, wherein the first API documentation further includes a first attribute, wherein the metadata corresponds to both the first endpoint and the first attribute, wherein the verified API specification further includes a verified attribute, the method further comprising: comparing the first attribute to the verified attribute, wherein the metadata is classified as a positive item responsive to the first attribute being the same as the verified attribute, wherein the metadata is classified as a negative item responsive to the first attribute not being the same as the verified attribute, wherein the training dataset further includes the metadata classified as a positive item or a negative item based on the comparison of the first attribute to the verified attribute, wherein the metadata model is further configured to be used to determine whether an unknown attribute is a positive attribute or a negative attribute based on corresponding metadata.

3. The method of claim 2, wherein comparing the first attribute to the verified attribute comprises: calculating a sequence match value for the first attribute compared to the verified attribute; and comparing the sequence match value for the first attribute compared to the verified attribute to a comparison threshold value, the first attribute being the same as the verified attribute if the sequence match value is equal to or greater than the comparison threshold value and the attribute not being the same as the verified attribute if the sequence match value is less than the comparison threshold value.

4. The method of claim 1, wherein the first API documentation further includes a first attribute and a portion of the metadata corresponds only to the first attribute, wherein the verified API specification further includes a verified attribute, the method further comprising: comparing the first attribute to the verified attribute, wherein the portion of the metadata that corresponds to the first attribute is classified as a positive item responsive to the first attribute being the same as the verified attribute, wherein the portion of the metadata that corresponds to the first attribute is classified as a negative item responsive to the first attribute not being the same as the verified attribute, wherein the training dataset further includes the portion of the metadata that corresponds to the first attribute classified as a positive item or a negative item, wherein the metadata model is further configured to be used to determine whether an unknown attribute is a positive attribute or a negative attribute based on corresponding metadata.

5. The method of claim 1 further comprising:
receiving a second API documentation including an unknown endpoint and unknown metadata that corresponds to the unknown endpoint; and
determining whether the unknown endpoint is a positive endpoint using the metadata model and the unknown metadata; and
responsive to the unknown endpoint being a positive endpoint, generating a revised API specification that includes the unknown endpoint and the unknown metadata from the second API documentation.

6. The method of claim 1, wherein the first API documentation further includes a plurality of attributes and a plurality of first endpoints that include the first endpoint, wherein the metadata includes a portion corresponding to each of the first endpoints, wherein the metadata further includes a portion corresponding to each of the first attributes, wherein the verified API specification further includes a plurality of verified attributes and a plurality of verified endpoints that include the verified endpoint, the method further comprising: comparing each of the first endpoints to each of the verified endpoints, wherein the portions of the metadata that correspond to one or more first endpoints are classified as positive items responsive to the one or more first endpoints being the same as one or more verified endpoints and wherein the portions of the metadata that correspond to one or more first endpoints are classified as negative items responsive to the one or more first endpoints not being the same as any of the verified endpoints; and comparing each of the first attributes to each of the verified attributes, wherein the portions of the metadata that correspond to one or more first attributes are classified as positive items responsive to the one or more first attributes being the same as one or more verified attributes and wherein the portions of the metadata that correspond to one or more first attributes are classified as negative items responsive to the one or more attributes not being the same as any of the verified attributes, wherein the training dataset further includes each portion of the metadata classified as a positive item or a negative item and the metadata model is further configured to be used to determine whether an unknown attribute is a positive attribute or a negative attribute based on corresponding metadata.

7. The method of claim 1, wherein generating the metadata model using the training dataset further comprises:
receiving a test dataset including a plurality of test endpoints, a plurality of test attributes, and portions of metadata that correspond to each of the test endpoints and each of the test attributes; and
testing the metadata model using the test endpoints, the test attributes, and the portions of metadata that correspond to the test endpoints and the test attributes.

8. The method of claim 1, wherein generating the metadata model using the training dataset comprises:
removing at least one tag from the training dataset;
separating each word and symbol in the training dataset, wherein each separated word and symbol is labeled as a different token;
extracting a stem of at least one token in the training dataset;
determining a frequency of at least one token in the in the training dataset; and
performing machine learning using the frequency of the at least one token in the training dataset, the metadata model being generated based on the machine learning.

9. A non-transitory computer-readable medium having encoded therein programming code executable by one or more processors to perform or control performance of operations of machine learning using application programming interface (API) documentation, the operations comprising:
receiving a first API documentation that includes a first endpoint and metadata that corresponds to the first endpoint, wherein the metadata includes at least one of a header, a page title, and a sentence that correspond to the first endpoint;
receiving a verified API specification that includes a verified endpoint;
comparing the first endpoint to the verified endpoint;
classifying the metadata by:
responsive to the first endpoint being the same as the verified endpoint, classifying the metadata as a positive item; or
responsive to the first endpoint not being the same as the verified endpoint, classifying the metadata as a negative item;
generating a training dataset including the metadata classified as a positive item or a negative item; and generating a metadata model using a machine learning algorithm and the training dataset, the metadata model configured to be used to determine whether an unknown endpoint is a positive endpoint based on corresponding metadata.

10. The non-transitory computer-readable medium of claim 9, wherein the first API documentation further includes a first attribute, wherein the metadata corresponds to both the first endpoint and the first attribute, wherein the verified API specification further includes a verified attribute, the operations further comprising: comparing the first attribute to the verified attribute, wherein the metadata is classified as a positive item responsive to the first attribute being the same as the verified attribute, wherein the metadata is classified as a negative item responsive to the first attribute not being the same as the verified attribute, wherein the training dataset further includes the metadata classified as a positive item or a negative item based on the comparison of the first attribute to the verified attribute, wherein the metadata model is further configured to be used to determine whether an unknown attribute is a positive attribute or a negative attribute based on corresponding metadata.

11. The non-transitory computer-readable medium of claim 9, wherein the first API documentation further includes a first attribute and a portion of the metadata corresponds only to the first attribute, wherein the verified API specification further includes a verified attribute, the operations further comprising: comparing the first attribute to the verified attribute, wherein the portion of the metadata that corresponds to the first attribute is classified as a positive item responsive to the first attribute being the same as the verified attribute, wherein the portion of the metadata that corresponds to the first attribute is classified as a negative item responsive to the first attribute not being the same as the verified attribute, wherein the training dataset further includes the portion of the metadata that corresponds to the first attribute classified as a positive item or a negative item, wherein the metadata model is further configured to be used to determine whether an unknown attribute is a positive attribute or a negative attribute based on corresponding metadata.

12. The non-transitory computer-readable medium of claim 9, the operations further comprising:
receiving a second API documentation including an unknown endpoint and unknown metadata that corresponds to the unknown endpoint; and
determining whether the unknown endpoint is a positive endpoint using the metadata model and the unknown metadata; and
responsive to the unknown endpoint being a positive endpoint, generating a revised API specification that includes the unknown endpoint and the unknown metadata from the second API documentation.

13. The non-transitory computer-readable medium of claim 9, wherein the first API documentation further includes a plurality of first attributes and a plurality of first endpoints that include the first endpoint, wherein the metadata also includes a portion corresponding to each of the first endpoints, wherein the metadata further includes a portion corresponding to each of the first attributes, wherein the verified API specification further includes a plurality of verified attributes and a plurality of verified endpoints that include the verified endpoint, the operations further comprising: comparing each of the first endpoints to each of the verified endpoints, wherein the portions of the metadata that correspond to one or more first endpoints are classified as positive items responsive to the one or more first endpoints being the same as one or more verified endpoints and wherein the portions of the metadata that correspond to one or more first endpoints are classified as negative items responsive to the one or more first endpoints not being the same as any of the verified endpoints; and comparing each of the first attributes to each of the verified attributes, wherein the portions of the metadata that correspond to one or more first attributes are classified as positive items responsive to the one or more first attributes being the same as one or more verified attributes and wherein the portions of the metadata that correspond to one or more first attributes are classified as negative items responsive to the one or more first attributes not being the same as any of the verified attributes, wherein the training dataset further includes the portions of the metadata classified as a positive item or a negative item and the metadata model is further configured to be used to determine whether an unknown attribute is a positive attribute or a negative attribute based on corresponding metadata.

14. The non-transitory computer-readable medium of claim 13, the operations further comprising: extracting the first endpoints, the first attributes, and the metadata from the first API documentation; and extracting the verified endpoints and the verified attributes from the verified API specification.

15. A system comprising:
one or more computer-readable storage media configured to store instructions; and
one or more processors communicatively coupled to the one or more computer-readable storage media and configured to, in response to execution of the instructions, cause the system to perform operations of machine learning using application programming interface (API) documentation, the operations comprising:
receiving a first API documentation that includes a first endpoint and metadata that corresponds to the first endpoint, wherein the metadata includes at least one of a header, a page title, and a sentence that correspond to the first endpoint;
receiving a verified API specification that includes a verified endpoint;
comparing the first endpoint to the verified endpoint;
classifying the metadata by:
responsive to the first endpoint being the same as the verified endpoint, classifying the metadata as a positive item; or
responsive to the first endpoint not being the same as the verified endpoint, classifying the metadata as a negative item;
generating a training dataset including the metadata classified as a positive item or a negative item; and
generating a metadata model using a machine learning algorithm and the training dataset, the metadata model configured to be used to determine whether an unknown endpoint is a positive endpoint based on corresponding metadata.

16. The system of claim 15, wherein the first API documentation further includes a first attribute, wherein the metadata corresponds to both the first endpoint and the first attribute, wherein the verified API specification further includes a verified attribute, the operations further comprising: comparing the first attribute to the verified attribute, wherein the metadata is classified as a positive item responsive to the first attribute being the same as the verified attribute, wherein the metadata is classified as a negative item responsive to the attribute not being the same as the verified attribute, wherein the training dataset further includes the metadata classified as a positive item or a negative item based on the comparison of the first attribute to the verified attribute, wherein the metadata model is further configured to be used to determine whether an unknown attribute is a positive attribute or a negative attribute based on corresponding metadata.

17. The system of claim 15, wherein the first API documentation further includes a first attribute and a portion of the metadata corresponds only to the first attribute, wherein the verified API specification further includes a verified attribute, the operations further comprising: comparing the first attribute to the verified attribute, wherein the portion of the metadata that corresponds to the first attribute is classified as a positive item responsive to the first attribute being the same as the verified attribute, wherein the portion of the metadata that corresponds to the first attribute is classified as a negative item responsive to the first attribute not being the same as the verified attribute, wherein the training dataset further includes the portion of the metadata that corresponds to the first attribute classified as a positive item or a negative item, wherein the metadata model is further configured to be used to determine whether an unknown attribute is a positive attribute or a negative attribute based on corresponding metadata.

18. The system of claim 15, the operations further comprising:
receiving a second API documentation including an unknown endpoint and unknown metadata that corresponds to the unknown endpoint; and
determining whether the unknown endpoint is a positive endpoint using the metadata model and the unknown metadata; and
responsive to the unknown endpoint being a positive endpoint, generating a revised API specification that includes the unknown endpoint and the unknown metadata from the second API documentation.

19. The system of claim 15, wherein the first API documentation further includes a plurality of first attributes and a plurality of first endpoints that include the first endpoint, wherein the metadata also includes a portion corresponding to each of the first endpoints, wherein the metadata further includes a portion corresponding to each of the first attributes, wherein the verified API specification further includes a plurality of verified attributes and a plurality of verified endpoints that include the verified endpoint, the operations further comprising: comparing each of the first endpoints to each of the verified endpoints, wherein the portions of the metadata that correspond to one or more first endpoints are classified as positive items responsive to the one or more first endpoints being the same as one or more verified endpoints and wherein the portions of the metadata that correspond to one or more first endpoints are classified as negative items responsive to the one or more first endpoints not being the same as any of the verified endpoints; and comparing each of the first attributes to each of the verified attributes, wherein the portions of the metadata that correspond to one or more first attributes are classified as positive items responsive to the one or more first attributes being the same as one or more verified attributes and wherein the portions of the metadata that correspond to one or more first attributes are classified as negative items responsive to the one or more first attributes not being the same as any of the verified attributes, wherein the training dataset further includes the portions of the metadata classified as a positive item or a negative item and the metadata model is further configured to be used to determine whether an unknown attribute is a positive attribute or a negative attribute based on a corresponding metadata.

20. The system of claim 19, the operations further comprising: extracting the first endpoints, the first attributes, and the metadata from the first API documentation; and extracting the verified endpoints and the verified attributes from the verified API specification.

* * * * *